United States Patent
Worthing et al.

(10) Patent No.: US 9,476,372 B2
(45) Date of Patent: Oct. 25, 2016

(54) SYSTEM AND METHOD FOR DIAGNOSING A FAULT IN A THROTTLE AREA CORRECTION THAT COMPENSATES FOR INTAKE AIRFLOW RESTRICTIONS

(71) Applicant: GM Global Technology Operations LLC, Detroit, MI (US)

(72) Inventors: James L. Worthing, Lansing, MI (US); Paul A. Bauerle, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 302 days.

(21) Appl. No.: 14/173,137

(22) Filed: Feb. 5, 2014

(65) Prior Publication Data
US 2015/0144098 A1  May 28, 2015

Related U.S. Application Data

(60) Provisional application No. 61/909,031, filed on Nov. 26, 2013.

(51) Int. Cl.
| *F02D 41/00* | (2006.01) |
| --- | --- |
| *F02D 11/10* | (2006.01) |
| *F02D 41/18* | (2006.01) |

(52) U.S. Cl.
CPC ......... *F02D 41/0002* (2013.01); *F02D 11/107* (2013.01); *F02D 41/18* (2013.01); *F02D 11/105* (2013.01); *F02D 11/106* (2013.01); *F02D 2011/108* (2013.01); *F02D 2200/602* (2013.01); *Y02T 10/42* (2013.01)

(58) Field of Classification Search
CPC ............... F02D 11/105; F02D 11/107; F02D 41/0002; F92D 2011/108
USPC .................... 123/337, 339.15, 399, 403, 349
See application file for complete search history.

(56) References Cited

U.S. PATENT DOCUMENTS

| 4,227,507 A | 10/1980 | Takase et al. |
| --- | --- | --- |
| 4,577,603 A | 3/1986 | Murakami et al. |
| 4,640,254 A | 2/1987 | Ninomiya |
| 6,390,055 B1 | 5/2002 | Sivashankar et al. |
| 6,698,398 B2 | 3/2004 | Bauerle |
| 6,711,492 B1 | 3/2004 | Pursifull et al. |
| 6,925,864 B2 | 8/2005 | Beyer et al. |
| 6,957,140 B1 | 10/2005 | Bauerle et al. |
| 7,024,305 B2 | 4/2006 | Stamm et al. |
| 7,287,510 B2 | 10/2007 | Costin et al. |

(Continued)

FOREIGN PATENT DOCUMENTS

JP  61123731  6/1986

*Primary Examiner* — Mahmoud Gimie

(57) ABSTRACT

A system according to the principles of the present disclosure includes a desired throttle area module, a correction factor module, a throttle control module, and an airflow compensation diagnostic module. The desired throttle area module determines a desired throttle area based on a driver input. The correction factor module determines a throttle area correction factor based on a difference between an estimated intake airflow and a measured intake airflow to compensate for a decrease in the measured intake airflow due to a flow restriction. The throttle control module determines a desired throttle position based on the desired throttle area and the throttle area correction factor. The airflow compensation diagnostic module diagnoses a fault in an amount of intake airflow compensation based on the throttle area correction factor.

20 Claims, 5 Drawing Sheets

(56) References Cited

U.S. PATENT DOCUMENTS

| | | | | |
|---|---|---|---|---|
| 7,300,385 B2* | 11/2007 | Cherry | ................ | B60W 10/02 477/181 |
| 7,464,695 B2 | 12/2008 | Bauerle et al. | | |
| 2005/0187699 A1* | 8/2005 | Stamm | ................ | F02D 11/105 701/103 |
| 2006/0065503 A1* | 3/2006 | Cherry | ................ | B60W 10/02 192/3.63 |
| 2008/0223335 A1* | 9/2008 | Bauerle | ................ | F02D 11/107 123/349 |
| 2009/0192698 A1* | 7/2009 | Smuda | ................ | F02D 29/06 701/106 |

* cited by examiner

SYSTEM AND METHOD FOR DIAGNOSING A FAULT IN A THROTTLE AREA CORRECTION THAT COMPENSATES FOR INTAKE AIRFLOW RESTRICTIONS

CROSS-REFERENCE TO RELATED APPLICATIONS

This application claims the benefit of U.S. Provisional Application No. 61/909,031, filed on Nov. 26, 2013. The disclosure of the above application is incorporated herein by reference in its entirety.

FIELD

The present disclosure relates to internal combustion engines, and more particularly, to systems and methods for diagnosing a fault in a throttle area correction that compensates for intake airflow restrictions.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a desired throttle area module, a correction factor module, a throttle control module, and an airflow compensation diagnostic module. The desired throttle area module determines a desired throttle area based on a driver input. The correction factor module determines a throttle area correction factor based on a difference between an estimated intake airflow and a measured intake airflow to compensate for a decrease in the measured intake airflow due to a flow restriction. The throttle control module determines a desired throttle position based on the desired throttle area and the throttle area correction factor. The airflow compensation diagnostic module diagnoses a fault in an amount of intake airflow compensation based on the throttle area correction factor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
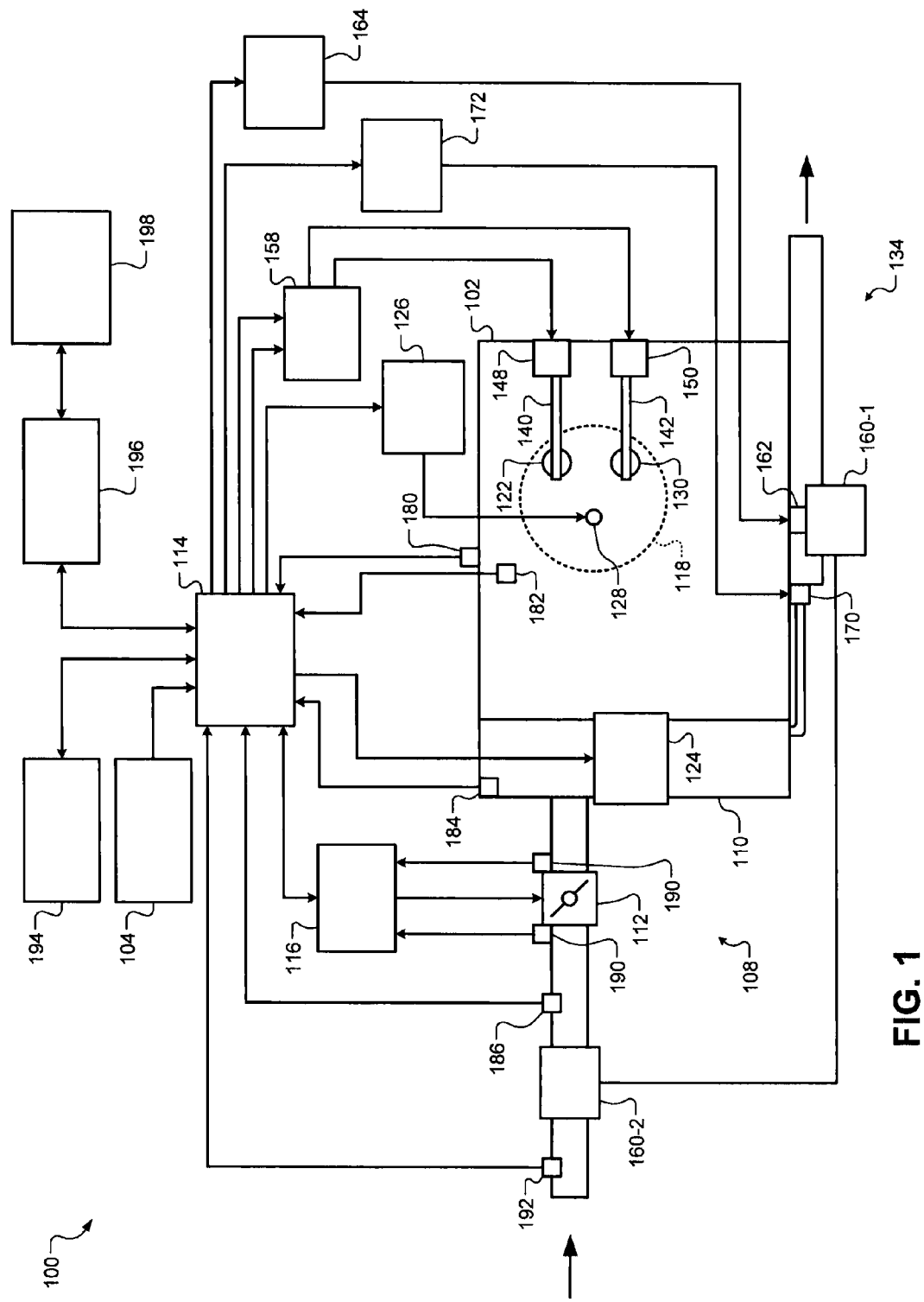
FIG. 1 is a functional block diagram of an example engine system according to the principles of the present disclosure.

Typically, an engine control system and method determines a desired throttle area based on a driver input, such as a throttle pedal position or a cruise control setting, and controls a throttle of an engine based on the desired throttle area. The system and method determines the desired throttle area based on a predetermined relationship between the desired throttle area and an amount of airflow through an intake manifold of the engine. Over time, deposits buildup on the throttle due to backflow through the throttle after the engine is shutoff, restricting airflow through the throttle. In turn, the predetermined relationship does not accurately reflect the actual amount of intake airflow corresponding to the desire throttle area.

In some cases, the system and method controls the throttle based on the desired throttle area and a throttle area correction factor. The throttle area correction factor is used to compensate for a decrease in intake airflow due to a flow restriction. The system and method determines the throttle area correction factor based on the desired throttle area using a lookup table that maps desired throttle area to throttle area correction factor. The values in the lookup table are adjusted based on a learning residual, which is an average of a plurality of differences between a measured intake airflow and an estimated intake airflow determined at a plurality of different times.

When the throttle is cleaned and deposits on the throttle are removed, the lookup table values and/or the learning residual may be reset (e.g., set to zero) using, for example, a diagnostic service tool. If the lookup table values are not reset, the throttle area correction factor is greater than necessary to compensate for a decrease in intake airflow due to a flow restriction. In turn, the amount of intake airflow may be greater than desired and the idle speed of the engine may be elevated, which may cause a diagnostic trouble code (DTC) to be set. When a DTC is set, the system and method stops adjusting the lookup table based on the learning residual, and therefore the idle speed of the engine remains at an elevated speed.

To address this issue, a system and method according to the present disclosure identifies when the throttle area correction factor is greater than necessary to compensate for a decrease in the amount of intake airflow due to a flow restriction. When over-compensation is identified, the system and method gradually decreases the throttle area correction factor to zero. The system and method may identify over-compensation when the learning residual is less than a first value and the throttle area correction factor is greater than a second value. The first value may be a predetermined value (e.g., 0), and the amount of intake airflow may be greater than desired when the learning residual is less than the first value. The second value may be a predetermined percentage of a limit applied to the throttle area correction factor.

Identifying over-compensation and decreasing the throttle area correction factor to zero when over-compensation is identified prevents diagnostic trouble codes from setting due to increased intake airflow and/or increased engine idle speed. In addition, identifying over-compensation and decreasing the throttle area correction factor to zero when over-compensation is identified allows the system and method to increase the limit applied to the throttle area correction factor. In turn, the throttle area may be adjusted by a greater amount to compensate for a decrease in intake airflow due to a flow restriction, which reduces warranty costs and improves driveability.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the TCM 194, and the HCM 196 may be integrated into one or more modules.

The ECM 114 determines a desired throttle area based on the driver input from the driver input module 104. To compensate for a decrease in intake airflow due to a flow restriction, the ECM 114 determines a throttle area correction factor and adjusts the desired throttle area based on the throttle area correction factor. The ECM 114 identifies when the amount of intake airflow compensation is greater than desired and reduces the throttle area correction factor to zero when over-compensation is identified.

Figure 2:
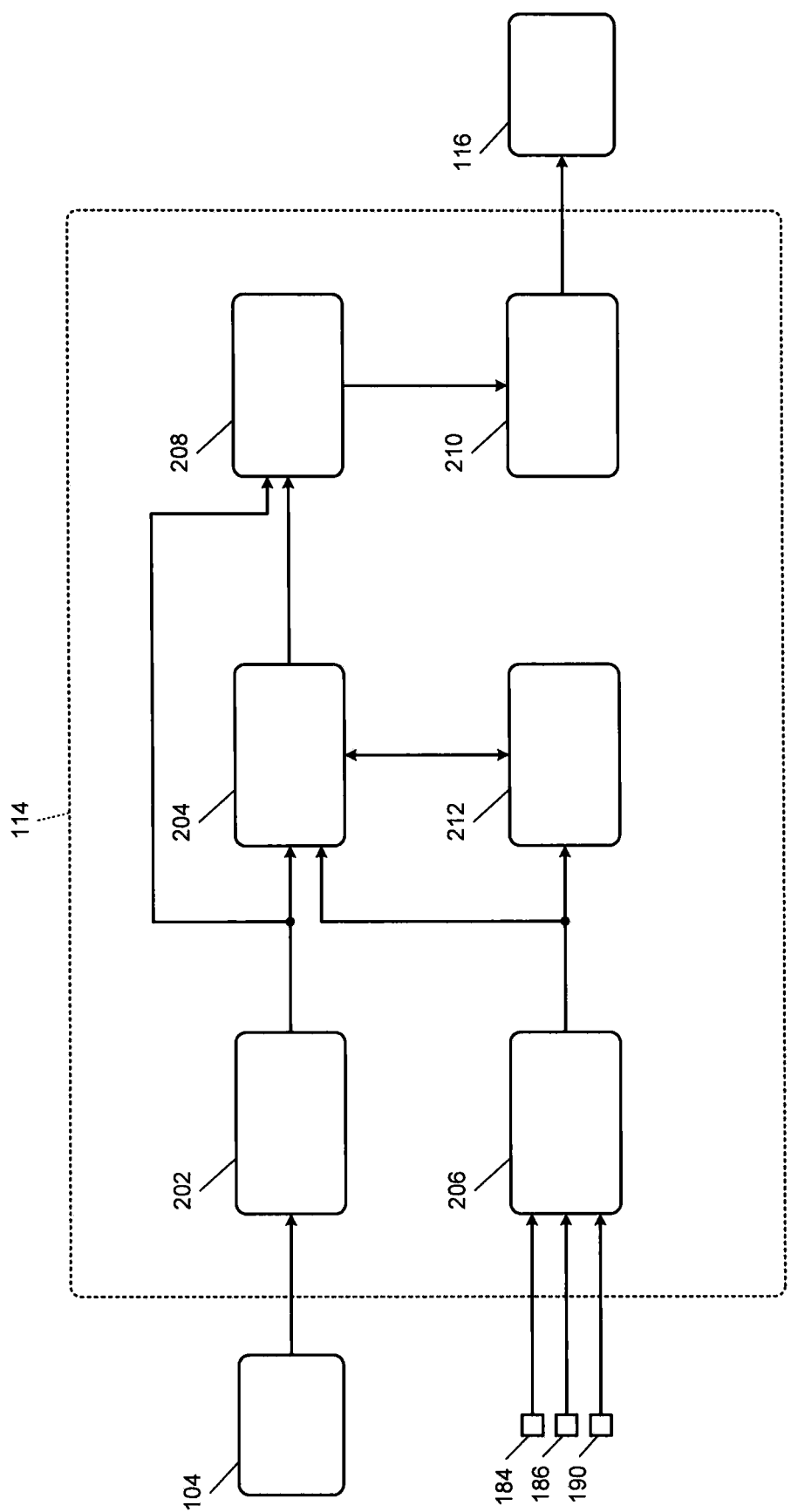
FIG. 2 is a functional block diagram of an example control system according to the principles of the present disclosure.

Referring now to FIG. 2, an example implementation of the ECM 114 includes a desired throttle area module 202. The desired throttle area module 202 determines a desired throttle area based on the driver input from the driver input module 104. The desired throttle area may be a throttle opening percentage. The desired throttle area may be referred to as an uncompensated throttle area since the desired throttle area is not adjusted to compensate for a decrease in the amount of intake airflow due to a flow restriction. The desired throttle area module 202 outputs the desired throttle area.

A correction factor module 204 determines a throttle area correction factor based on the desired throttle area using a correction table. The correction factor module 204 may update the correction table based on a learning residual to account for changes in intake airflow due to a flow restriction. The correction table may be a lookup table that maps a plurality of desired throttle areas to a plurality of throttle area correction factors. If the desired throttle area determined by the desired throttle area module 202 is between two of the desired throttle areas in the correction table, the correction factor module 204 may determine the correction factor using interpolation. The correction factor module 204 outputs the throttle area correction factor.

The correction factor module 204 may determine whether the desired throttle area corresponds to a low flow region or a high flow region. The correction factor module 204 may determine that the desired throttle area corresponds to a low flow region when the desired throttle area is less than a first threshold (e.g., a first predetermined value). The correction factor module 204 may determine that the desired throttle area corresponds to a high flow region when the desired throttle area is greater than a second threshold (e.g., a second predetermined value). The second threshold may be equal to the first threshold or greater than the first threshold.

If the desired throttle area corresponds to a low flow region, the correction factor module 204 may determine the throttle area correction factor using a low region table. The throttle area correction factors in the low region table may increase slowly and/or linearly as the desired throttle area increases. The correction factor module 204 may compare the throttle area correction factor from the low region table to a low correction factor limit (e.g., 2 percent). If the throttle area correction factor is greater than the low correction factor limit, the correction factor module 204 may set the throttle area correction factor equal to the low correction factor limit.

If the desired throttle area corresponds to a high flow region, the correction factor module 204 may determine the throttle area correction factor using a high region table. The throttle area correction factors in the high region table may increase rapidly and/or nonlinearly as the desired throttle area increases. The correction factor module 204 may compare the throttle area correction factor from the high region table to a high correction factor limit. The high correction factor limit may be equal to the low correction factor limit or different than the low correction factor limit. If the throttle area correction factor is greater than the high correction factor limit, the correction factor module 204 may set the throttle area correction factor equal to the high correction factor limit.

The low region table and the high region table may include overlapping values. For example, the highest desired throttle area and corresponding throttle area correction factor in the low region table may be equal to the lowest desired throttle area and corresponding throttle area correction factor in the high region table. In another example, the low region table may include throttle area correction factors for desired throttle areas from 0 percent to 4 percent, and the high region table may include throttle area correction factors for desired throttle areas from 4 percent to 20 percent. If the desired throttle area is greater than the highest desired throttle area in the high region table, the correction factor module 204 may use the throttle area correction factor corresponding to the highest desired throttle area.

A learning residual module 206 determines the learning residual based on the measured intake airflow from the MAF sensor 186 and an intake airflow that is estimated based on the throttle position from the TPS 190. The learning residual module 206 may set the learning residual equal to an average of a predetermined number of residual values at the current throttle position. The learning residual module 206 may determine each residual value based on the measured intake airflow ($MAF_{MEAS}$) and the estimated intake airflow ($MAF_{EST}$) using the following relationship:

$$\text{Residual Value} = (MAF_{EST} - MAF_{MEAS})/MAF_{MEAS} \quad (1)$$

The learning residual module 206 may obtain the residual values from a residual table that maps throttle position to residual values. The learning residual module 206 may determine the learning residual based on an average of the residual value determined in a present iteration and the residual values obtained from the residual table. If the current throttle position is between throttle positions in the residual table, the learning residual module 206 may determine the residual values based on the residual table using interpolation. The learning residual module 206 stores the residual value of the present iteration in the residual table and outputs the learning residual.

Before determining the learning residual, the learning residual module 206 may confirm that one or more learning conditions are met. A first learning condition is met when the engine 102 has been idling for a period that is less than a predetermined period. The relationship between the throttle position and the estimated intake airflow may assume that the intake air temperature is within a certain range, and this assumption may be incorrect when the engine idling period is greater than the predetermined period. A second learning condition is met when the engine 102 is operating at steady state. A third learning condition is met when the measured intake airflow is greater than a predetermined value. A fourth learning condition is met when the manifold pressure has been measured within a predetermined distance.

In addition, learning conditions may not be met when a fault is diagnosed in one or more sensors or actuators. For example, learning conditions may not be met when a fault is diagnosed in the throttle valve 112, the MAP sensor 184, the MAF sensor 186, the TPS 190, the IAT sensor 192, a pedal position sensor, and/or an ambient pressure sensor. Further, learning conditions may not be met when the measured intake airflow is greater than a threshold (e.g., a predetermined value) or when the engine idle speed is outside of a predetermined range.

If one or more learning conditions are not met, the learning residual module 206 may not determine the learning residual. The correction factor module 204 may not update the correction table based on the learning residual when the learning residual module 206 does not determine the learning residual. Alternatively, the correction factor module 204 may update the correction table using the learning residual from a previous iteration, which may result in no change to the values in the correction table.

The correction factor module 204 may determine an air learn modifier based on the learning residual and update the correction table based on the air learn modifier. For example, the correction factor module 204 may store the air learn modifier in the correction table as the throttle area correction factor at the current throttle position. The correction factor module 204 may determine the air learn modifier based on a sum of the throttle area correction factor previously stored in the correction table and a learn throttle area. The learn throttle area may be set equal to a product of the learning residual and the desired throttle area.

To control the rate at which the throttle area correction factor is adjusted, the correction factor module 204 may determine whether an absolute value of the learn throttle area is greater than an absolute value of a learn rate limit modifier. If the absolute value of the learn throttle area is greater than the absolute value of the learn rate limit modifier, the correction factor module 204 may determine the air learn modifier based on a sum of the throttle area correction factor and the learn rate limit modifier. Otherwise, the correction factor module 204 may determine the air learn modifier based on the sum of the throttle area correction factor and the learn throttle area.

Before determining the air learn modifier, the correction factor module 204 may confirm that one or more stability conditions are met. A first stability condition may be met when the engine speed is within a predetermined range. A second stability condition may be met when a period since the air learn modifier was last determined is greater than a predetermined period. A third stability condition may be met when a vacuum across the throttle valve 112 is greater than a predetermined value. A fourth stability condition may be met when the desired throttle area is less than a predetermined area. If one or more stability conditions is not met, the correction factor module 204 may not determine the air learn modifier and therefore may not update the correction table based on the air learn modifier.

A compensated throttle area module 208 determines a compensated throttle area based on the desired throttle area and the throttle area correction factor. The compensated throttle area module 208 may determine the compensated throttle area based on a sum of the desired throttle area and the throttle area correction factor. For example, the compensated throttle area module 208 may set the compensated throttle area equal to a maximum value of zero and the sum of the desired throttle area and the throttle area correction factor. The compensated throttle area module 208 outputs the compensated throttle area.

A throttle control module 210 controls the throttle actuator module 116 based on the compensated throttle area. The throttle control module 210 may generate a throttle position signal indicating a desired throttle position, and the throttle actuator module 116 may adjust the throttle valve 112 to achieve the desired throttle position. The throttle control module 210 may determine the desired throttle position based on the compensated throttle area using, for example, a lookup table and/or an equation.

An airflow compensation diagnostic module 212 identifies when an amount of throttle area correction is greater than necessary to compensate for a decrease in intake airflow due to a flow restriction, which may be referred to as over-compensation. The airflow compensation diagnostic module 212 may diagnose a fault in the throttle area correction factor or the amount of intake airflow compensation when over-compensation is identified. The airflow compensation diagnostic module 212 may generate a signal indicating when over-compensation is identified.

The airflow compensation diagnostic module 212 may identify over-compensation when the learning residual is less than a first value and the throttle area correction factor is greater than a second value. The first value may be a predetermined value that is less than or equal to zero (e.g., −0.55). Thus, the learning residual may be negative when the learning residual is less than the first value, indicating that the amount of intake airflow provided by the current throttle area correction factor is greater than that desired by a driver.

The second value may be a predetermined percentage (e.g., 90 percent) of a correction factor limit. If the desired throttle area corresponds to the low flow region, the second value may be a first predetermined percentage of the low correction factor limit. Otherwise, the second value may be a second predetermined percentage of the high correction factor limit. The second predetermined percentage may be equal to the first predetermined percentage or different than the first predetermined percentage.

When over-compensation is identified, the correction factor module 204 may gradually decrease or ramp the throttle area correction factor to zero. The correction factor module 204 may gradually decrease the throttle area correction factor to zero to avoid abrupt changes in engine speed that may be objectionable to the driver. To ramp down the throttle area correction factor, the correction factor module 204 may subtract a predetermined value (e.g., 0.095 percent) from the throttle area correction factor determined in a previous iteration to obtain a ramped correction factor.

While the correction factor module 204 is ramping down the throttle area correction factor, the throttle area correction factor obtained from the correction table may decrease due to a decrease in the desired throttle area. As a result, the ramped correction factor may be greater than the throttle area correction factor obtained from the table. Thus, the correction factor module 204 may then set the throttle area correction factor equal to a minimum value of the ramped correction factor and the throttle area correction factor obtained from the correction table. When the throttle area correction factor is less than or equal to zero, the correction factor module 204 may reset the correction and residual tables (e.g., set the values in the tables equal to zero).

Figure 3:
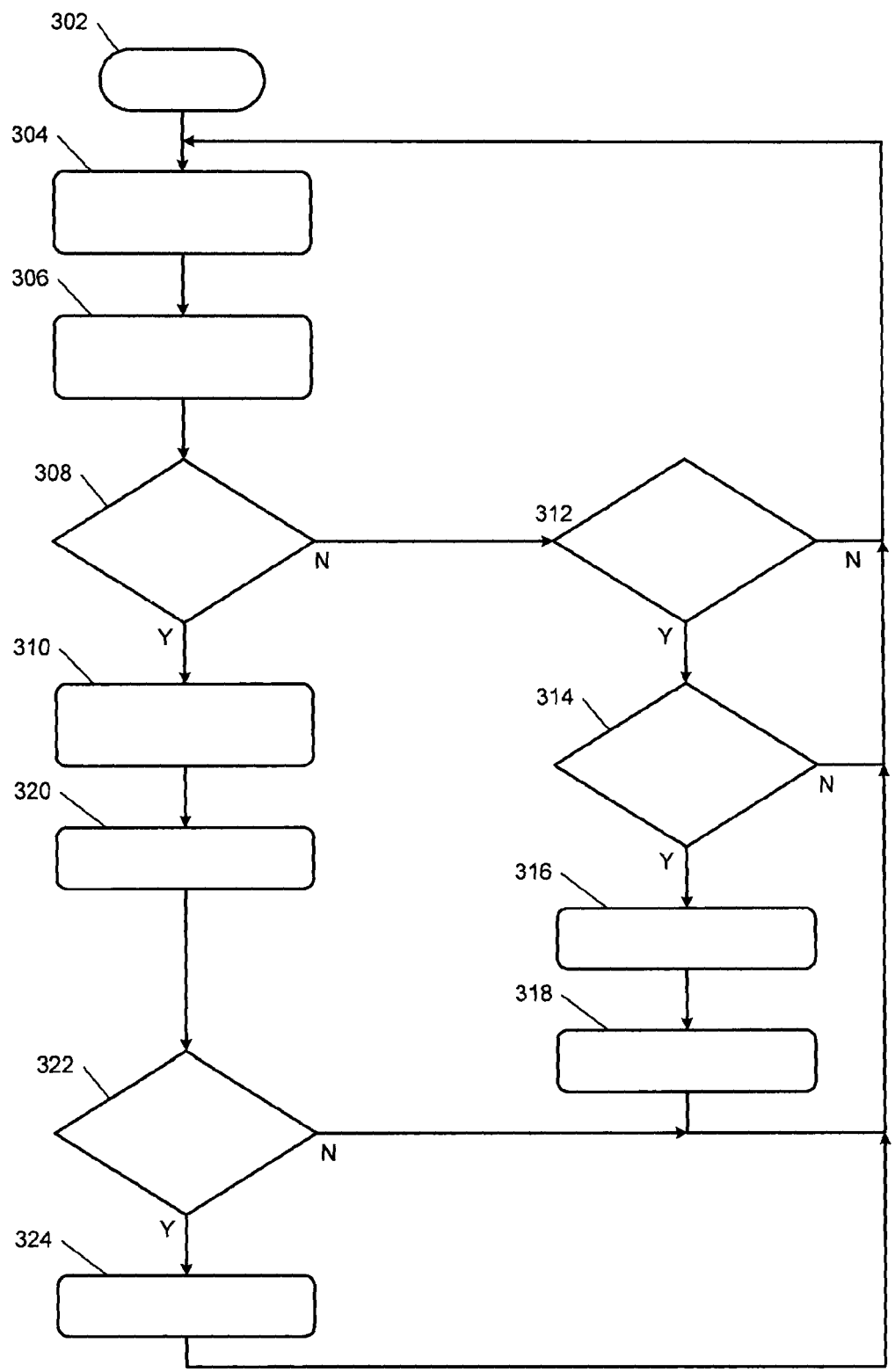
FIGS. 3 through 5 are flowcharts illustrating an example control method according to the principles of the present disclosure.

Referring now to FIG. 3, a method for identifying a fault in a throttle area correction factor that compensates for a decrease in intake airflow due to a flow restriction begins at 302. At 304, the method determines a throttle area correction factor ($A_{CORR}$) based on an uncompensated throttle area ($A_{UNCOMP}$) using a correction table, as described in further detail below with reference to FIG. 4. At 306, the method determines a learning residual ($RES_{LRN}$) based on intake airflow using a residual table, as described in further detail below with reference to FIG. 5.

At 308, the method determines whether over-compensation has been identified since the correction and the residual tables have been reset (e.g., the values in the tables have been set to zero). The method identifies over-compensation when the method determines that the amount of throttle area correction is greater than necessary to compensate for a decrease in intake airflow due to a flow restriction. If an over-compensation has been identified since the correction and residual tables have been reset, the method continues at 310. Otherwise, the method continues at 312.

At 312, the method determines whether the learning residual is less than a first value. The first value may be a predetermined value that is less than or equal to zero (e.g., −0.55). Thus, the learning residual may be negative when the learning residual is less than the first value, indicating that the amount of intake airflow provided by the current throttle area correction factor is greater than that desired by a driver. If the learning residual is less than the first value, the method continues at 314. Otherwise, the method continues at 304.

At 314, the method determines whether the throttle area correction factor is greater than a second value. The second value may be a predetermined percentage (e.g., 90 percent) of a correction factor limit such as a low correction factor limit or a high correction factor limit, which are discussed in further detail below with reference to FIG. 4. If the throttle area correction factor is greater than the second value, the method continues at 316. Otherwise, the method continues at 304.

At 316, the method identifies over-compensation. For example, the method may diagnose a fault in the amount of intake airflow compensation or the amount of throttle area correction provided to compensate for a decrease in intake airflow due to a flow restriction. At 318, the method sets the throttle area correction factor equal to the throttle area correction factor obtained from the correction table minus a predetermined value (e.g., 0.095 percent). In this regard, the method starts to gradually decrease or ramp down the throttle area correction factor when over-compensation is identified.

At 310, the method sets a ramped correction factor equal to the throttle area correction factor determined in a previous iteration minus the predetermined value. At 320, the method sets the throttle area correction factor equal to a minimum value of the throttle area correction factor obtained from the correction table and the ramped correction factor. Thus, if the throttle area correction factor obtained from the correction table is less than the ramped correction factor due to a decrease in the desired throttle area, the method uses the throttle area correction factor from the correction table.

At 322, the method determines whether the throttle area correction factor is less than or equal to zero. If the throttle area correction factor is less than or equal to zero, the method resets the correction and residual tables (e.g., set the values in the tables equal to zero). Otherwise, the method continues at 304.

Figure 4:
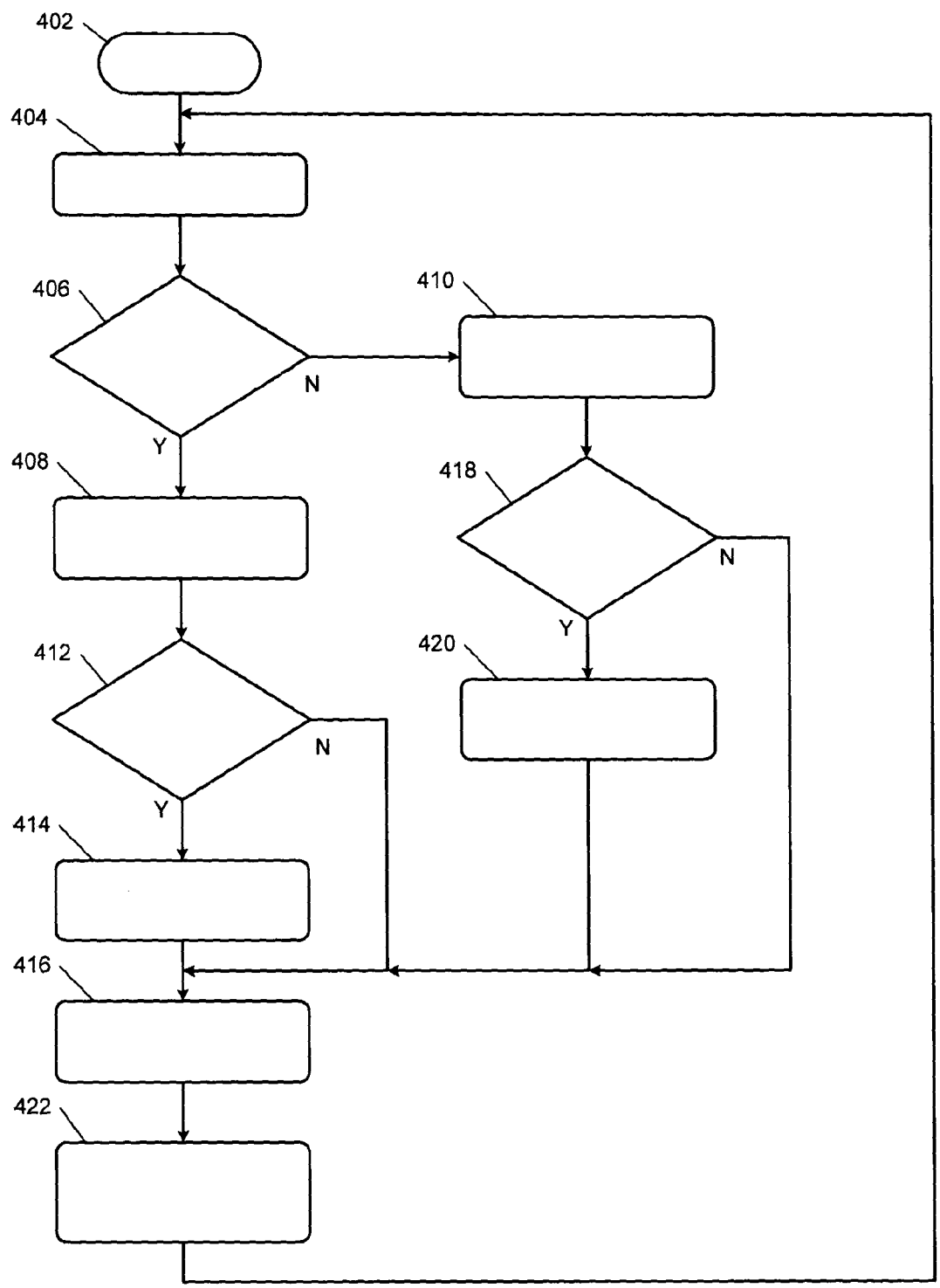

Referring now to FIG. 4, a method for determining a throttle area correction factor ($A_{CORR}$) and for controlling a throttle valve of an engine based on the throttle area correction factor begins at 402. At 404, the method determines an uncompensated throttle area ($A_{UNCOMP}$). The method may determine the uncompensated throttle area based on a driver input such as an accelerator pedal position or a cruise control setting using, for example, a lookup table. The uncompensated throttle area is not adjusted to compensate for a decrease in intake airflow due to a flow restriction.

At 406, the method determines whether the uncompensated throttle area is in a high flow region. The method may determine that the uncompensated throttle area is in the high flow region when the uncompensated throttle area is greater than a predetermined value. If the uncompensated throttle area is in the high flow region, the method continues at 408. Otherwise, the method continues at 410.

At 408, the method determines a throttle area correction factor based on the uncompensated throttle area using a high (HI) region table. The high region table may be a lookup table that maps uncompensated throttle area to throttle area correction factor. The throttle area correction factors in the high region table may increase rapidly and/or nonlinearly as the desired throttle area increases.

At 412, the method determines whether the throttle area correction factor is greater than a high correction factor limit ($A_{CORR\_HI\_LIMIT}$). The high correction factor limit may be a predetermined throttle opening percentage (e.g., 2 percent). If the throttle area correction factor is greater than the high correction factor limit, the method continues at 414. Otherwise, the method continues at 416. At 414, the method sets the throttle area correction factor equal to the high correction factor limit.

At 410, the method determines a throttle area correction factor based on the uncompensated throttle area using a low (LO) region table. The low region table may be a lookup table that maps uncompensated throttle area to throttle area correction factor. The throttle area correction factors in the low region table may increase slowly and/or linearly as the desired throttle area increases.

At 418, the method determines whether the throttle area correction factor is greater than a low correction factor limit ($A_{CORR\_LO\_LINT}$). The low correction factor limit may be a predetermined throttle opening percentage and may be equal to or different than the high correction factor limit. If the throttle area correction factor is greater than the low correction factor limit, the method continues at 420. Otherwise, the method continues at 416. At 420, the method sets the throttle area correction factor equal to the low correction factor limit.

At 416, the method determines a compensated throttle area ($A_{COMP}$) based on the uncompensated throttle area and the throttle area correction factor. The method may determine the compensated throttle area based on a sum of the desired throttle area and the throttle area correction factor. For example, the method may set the compensated throttle area equal to a maximum value of zero and the sum of the desired throttle area and the throttle area correction factor.

At 422, the method determines a desired throttle position based on the compensated throttle area. For example, the method may determine the desired throttle position based on the compensated throttle area using a lookup table that maps throttle area to throttle position. The method may control the throttle valve to achieve the desired throttle position.

Figure 5:
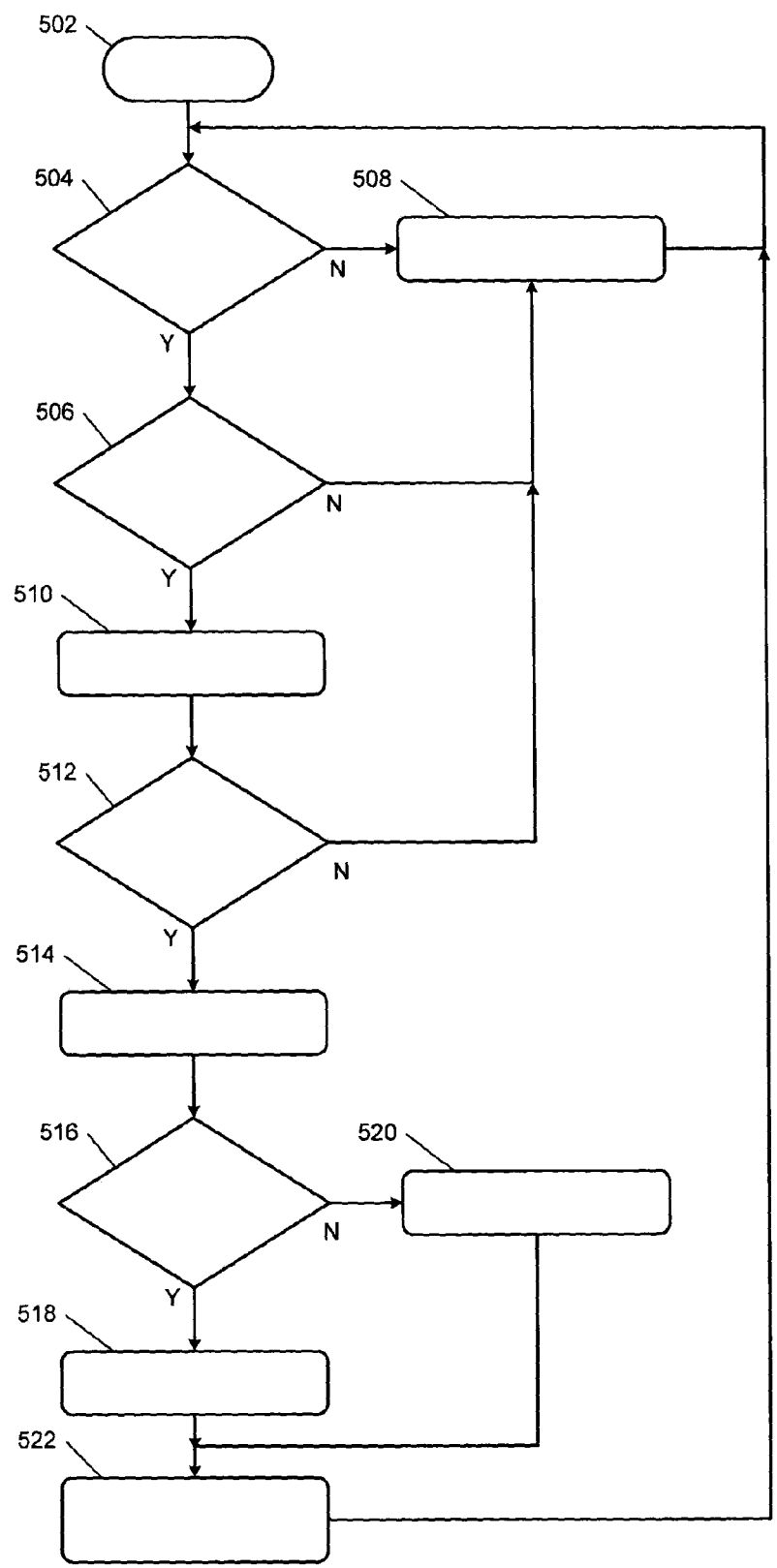

Referring now to FIG. 5, a method for determining a learning residual ($RES_{LRN}$) and for updating a correction table based on the learning residual begins at 502. The correction table may be used to determine a throttle area correction factor. At 504, the method determines whether learning conditions are met. For example, the method may determine whether an engine idling period is less than a predetermined period, whether an engine is operating at steady state, and/or whether intake airflow is greater than a predetermined value. Additionally or alternatively, the method may determine whether manifold pressure has been measured within a predetermined distance.

In addition, learning conditions may not be met when a fault is diagnosed a sensor and/or an actuator. For example, learning conditions may not be met when a fault is diagnosed in a throttle valve, a manifold pressure sensor, a manifold airflow sensor, a throttle position sensor, an intake air temperature sensor, a pedal position sensor, and/or an ambient pressure sensor. Further, learning conditions may not be met when the intake airflow is greater than a threshold (e.g., a predetermined value) or when the engine idle speed is outside of a predetermined range.

If the learning conditions are met, the method continues at 506. Otherwise, the method continues at 508. At 508, the method inhibits learning related to quantifying a decrease in intake airflow due to a flow restriction and adjusting the throttle area to compensate for the decrease. For example, the method may stop determining the learning residual and stop updating the correction table based on the learning residual.

At 506, the method determines whether an absolute difference between a measured intake airflow ($MAF_{MEAS}$) and an estimated intake airflow ($MAF_{EST}$) is less than or equal to an intake airflow threshold ($MAF_{THR}$). The measured intake airflow may be received from a mass airflow (MAF) sensor and the estimated intake airflow may be calculated based on an input from a manifold absolute pressure (MAP) sensor. If the absolute difference between the measured intake airflow and the estimated intake airflow is less than or equal to the intake airflow threshold, the method continues at 510. Otherwise, the method determines that the MAF sensor and/or the MAP sensor shifted and continues at 508.

At 512, the method determines whether stability conditions are met. For example, the method may determine whether engine speed is within a predetermined range and/or whether a period since an air learn modifier was last determined is greater than a predetermined period. Additionally or alternatively, the method may determine whether a vacuum across the throttle valve is greater than a predetermined value and/or whether a desired throttle area is less than a predetermined area.

If the stability conditions are met, the method continues at 514. Otherwise, the method continues at 508. At 514, the method determines a learned throttle area based on the learning residual. For example, the method may set the learn throttle area equal to a product of the learning residual and the desired throttle area.

At 516, the method may determine whether an absolute value of the learn throttle area is greater than an absolute value of a learn rate limit modifier ($MOD_{LRNRTLIM}$). If the absolute value of the learn throttle area is greater than the absolute value of the learn rate limit modifier, the method may continue at 518. Otherwise, the method may continue at 520.

At 518, the method determines an air learn modifier ($MOD_{LRN}$) based on a sum of the throttle area correction factor previously stored in the correction table and the learn rate limit modifier. At 520, the method determines the air learn modifier based on the sum of the throttle area correction factor previously stored in the correction table and the learn throttle area. At 522, the method updates the correction table based on the air learn modifier. For example, the method may store the air learn modifier in the correction table as the throttle area correction factor at the current throttle position.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a desired throttle area module that determines a desired throttle area based on a driver input;
a correction factor module that determines a throttle area correction factor based on a difference between an estimated intake airflow and a measured intake airflow to compensate for a decrease in the measured intake airflow due to a flow restriction;
a throttle control module that determines a desired throttle position based on the desired throttle area and the throttle area correction factor; and
an airflow compensation diagnostic module that diagnoses a fault in an amount of intake airflow compensation based on the throttle area correction factor and the difference between the estimated intake airflow and the measured intake airflow.

2. A system comprising:
a desired throttle area module that determines a desired throttle area based on a driver input;
a correction factor module that determines a throttle area correction factor based on a difference between an estimated intake airflow and a measured intake airflow to compensate for a decrease in the measured intake airflow due to a flow restriction;
a throttle control module that determines a desired throttle position based on the desired throttle area and the throttle area correction factor;
an airflow compensation diagnostic module that diagnoses a fault in an amount of intake airflow compensation based on the throttle area correction factor; and
a learning residual module that determines a learning residual based on an average of N differences between the estimated intake airflow and the measured intake airflow at N different times, wherein:
the correction factor module determines the throttle area correction factor based on the learning residual; and
N is an integer greater than one.

3. The system of claim 2 wherein the correction factor module:
determines the throttle area correction factor based on the desired throttle area using a correction table; and
adjusts values in the correction table based on the learning residual.

4. The system of claim 2 wherein the airflow compensation diagnostic module diagnoses a fault in the amount of intake airflow compensation based on the throttle area correction factor and the learning residual.

5. The system of claim 4 wherein the airflow compensation diagnostic module determines that the amount of intake airflow compensation is greater than desired when:
the learning residual is less than a first value; and
the throttle area correction factor is greater than a second value.

6. The system of claim 5 wherein the first value is less than or equal to zero.

7. The system of claim 5 wherein:
the correction factor module maintains the throttle area correction factor within a predetermined limit; and
the airflow compensation diagnostic module determines the second value based on the predetermined limit.

8. The system of claim 5 wherein the correction factor module decreases the throttle area correction factor to zero when the airflow compensation diagnostic module determines that the amount of intake airflow compensation is greater than desired.

9. The system of claim 8 wherein the correction factor module:
determines a first correction factor based on the desired throttle area using a correction table;
the correction factor module determines a second correction factor by subtracting a predetermined value from a previous correction factor determined in a previous iteration; and
determines a present correction factor in a present iteration based on a minimum value of the first correction factor and the second correction factor.

10. The system of claim 9 wherein the correction factor module sets all values in the correction table equal to zero when the throttle area correction factor is less than or equal to zero.

11. A method comprising:
determining a desired throttle area based on a driver input;
determining a throttle area correction factor based on a difference between an estimated intake airflow and a measured intake airflow to compensate for a decrease in the measured intake airflow due to a flow restriction;
determining a desired throttle position based on the desired throttle area and the throttle area correction factor; and
diagnosing a fault in an amount of intake airflow compensation based on the throttle area correction factor and the difference between the estimated intake airflow and the measured intake airflow.

12. A method comprising:
determining a desired throttle area based on a driver input;
determining a throttle area correction factor based on a difference between an estimated intake airflow and a measured intake airflow to compensate for a decrease in the measured intake airflow due to a flow restriction;
determining a desired throttle position based on the desired throttle area and the throttle area correction factor;
diagnosing a fault in an amount of intake airflow compensation based on the throttle area correction factor;
determining a learning residual based on an average of N differences between the estimated intake airflow and the measured intake airflow at N different times; and
determining the throttle area correction factor based on the learning residual, wherein N is an integer greater than one.

13. The method of claim 12 further comprising:
determining the throttle area correction factor based on the desired throttle area using a correction table; and
adjusting values in the correction table based on the learning residual.

14. The method of claim 12 further comprising diagnosing a fault in the amount of intake airflow compensation based on the throttle area correction factor and the learning residual.

15. The method of claim 14 further comprising determining that the amount of intake airflow compensation is greater than desired when:
the learning residual is less than a first value; and
the throttle area correction factor is greater than a second value.

16. The method of claim 15 wherein the first value is less than or equal to zero.

17. The method of claim 15 further comprising:
maintaining the throttle area correction factor within a predetermined limit; and
determining the second value based on the predetermined limit.

18. The method of claim 15 further comprising decreasing the throttle area correction factor to zero after determining that the amount of intake airflow compensation is greater than desired.

19. The method of claim 18 further comprising:
determining a first correction factor based on the desired throttle area using a correction table;
determining a second correction factor by subtracting a predetermined value from a previous correction factor determined in a previous iteration; and
determining a present correction factor in a present iteration based on a minimum value of the first correction factor and the second correction factor.

20. The method of claim 19 further comprising setting all values in the correction table equal to zero when the throttle area correction factor is less than or equal to zero.

* * * * *